United States Patent [19]
Hammett et al.

[11] Patent Number: 5,236,634
[45] Date of Patent: Aug. 17, 1993

[54] CARBURETOR NEEDLE VALVE ADJUSTMENT LIMITER CAP AND METHOD OF ADJUSTING FUEL FLOW

[75] Inventors: Steven L. Hammett; David L. Speirs, both of Cass City, Mich.

[73] Assignee: Walbro Corporation, Cass City, Mich.

[21] Appl. No.: 949,895

[22] Filed: Sep. 23, 1992

[51] Int. Cl.$^5$ .............................................. F02M 3/08
[52] U.S. Cl. ............................. 261/71; 261/DIG. 38; 137/382
[58] Field of Search ................ 261/DIG. 38, 71; 137/382

[56] References Cited

U.S. PATENT DOCUMENTS

| | | | |
|---|---|---|---|
| 3,618,906 | 11/1971 | Charron | 261/41 |
| 4,271,095 | 6/1981 | Maeda | 261/71 |
| 4,283,353 | 8/1981 | Miller | 261/DIG. 38 |
| 4,333,891 | 6/1982 | Miller | 137/382 |
| 5,055,238 | 10/1991 | Araki | 261/35 |

FOREIGN PATENT DOCUMENTS

2548226 5/1976 Fed. Rep. of Germany ... 261/DIG. 38
61-134555 8/1986 Japan .

*Primary Examiner*—Tim Miles
*Attorney, Agent, or Firm*—Barnes, Kisselle, Raisch, Choate, Whittemore & Hulbert

[57] ABSTRACT

A cap and method for limiting the range of adjustment of a fuel flow metering valve in a carburetor. The cap has a body with an arm projecting generally radially outwardly therefrom to abut against a stop carried by the carburetor to limit valve rotation and a passage therein for telescopically axially receiving the head end of a shank of the valve. Portions within the passage enable the cap to be retained on the shank of the valve in a freely rotating first position during assembly and arm orientation, in a second position securing the cap to the valve to limit adjustment and maintain emissions calibration, and in a third position to releasably drivingly engage the valve to perform fuel flow adjustment before securing the cap to the valve.

35 Claims, 4 Drawing Sheets

CARBURETOR NEEDLE VALVE ADJUSTMENT LIMITER CAP AND METHOD OF ADJUSTING FUEL FLOW

FIELD OF THE INVENTION

This invention relates to carburetors for internal combustion engines and more particularly to a limiter of the rotational adjustment of fuel flow metering valve of the carburetor.

BACKGROUND

In response to relatively recent federal and state "clean air" regulations, carburetor limiter caps have been used to restrict carburetor fuel flow metering valve adjustment to prevent the excessive emission of carbon monoxide and unburned hydrocarbons from internal combustion engines. Primarily, limiters have been used with conventional float bowl carburetors to control automobile exhaust emissions. More recently their use has been extended to diaphragm-type carburetors in small engines simply to prevent gross misadjustment of fuel flow. However, future emissions regulations are expected to extend the role of limiter caps to control engine emissions.

Fuel flow within a carburetor is commonly metered during no load or idle engine operation by a first "idle" needle valve and during part or full load operation by a second "main" needle valve. Typically, each valve has a threaded cylindrical body with an enlarged knurled head at one end and a conical or needle shaped valve control surface at the opposite end which is received within an opening in the carburetor body. To calibrate fuel flow, each valve is rotatively adjusted to axially extend or retract the valve control surface within a fuel passage in the carburetor until optimum fuel flow through the passage is achieved. Pre-calibration of the carburetor on a flow test bench may be performed prior to being assembled to an engine. Subsequent overadjustment of fuel flow is prevented by affixing a limiter cap over the head of each valve. After assembly to an engine, it is customary to adjust the metering valves, if needed, to fine tune fuel flow to actual engine demand.

These limiter caps generally consist of a cylindrical body having an opening at one end for axially receiving the valve head in tight fitting engagement to prevent removal and promote rotation of both in unison. A recess in the opposite end of the cap is provided to enable an adjustment tool to engage the valve directly or the cap alone to rotate both in unison to make fuel flow adjustments. Projecting radially outwardly from the cap body is an arm for abutting against a fixed stop extending from the carburetor to limit valve rotation. Representative limiter caps are described in Charron U.S. Pat. No. 3,618,906 and Araki U.S. Pat. No. 5,055,238.

Stop members such as an integrally cast projection of the carburetor or the body of another cap press-fit on an adjacent needle valve may be used to limit valve and cap rotation and hence adjustment Similarly, Japanese Patent Publication Jitsuko Sho 61-13455, discloses a hollow cylindrical collar limiter which has an outwardly extending arm for abutting directly against the head of an adjacent valve to limit adjustment.

Previous to the use of these limiting devices, fuel flow metering valves in carburetors were freely adjustable without limitation. At present, however, limiters have not been universally adopted for carburetors for small engine applications. Particularly, because of numerous difficulties, caps of conventional construction have not been used in applications, such as hand-held tools like weed trimmers, edgers, blowers, chain saws, and hedge trimmers, where carburetor access is restricted by an engine shroud enclosing the engine compartment.

While access openings are provided in the shroud by a grommet to adjust each valve, they are not large enough to allow limiter cap installation after final calibration without removing the shroud. Further, limited accessibility adds to the difficulty of accurately orienting the arm of the cap with respect to the optimum valve position and the stop or stops of the carburetor to provide the appropriate range of adjustability.

Removal and reorientation of the cap after calibration with the cap secured to the valve is impractical and time consuming as it would require the application of considerable force to remove the limiter possibly damaging the cap. Production time may also be lost if the shroud or grommet must be disassembled to gain sufficient access to the cap. Unfortunately, disturbing the valve in this manner to remove the cap would likely require recalibration before reinstalling the same or a different limiter cap.

For example, if a two-stroke engine is sold with the adjustment range incorrectly set, subsequent user adjustment could increase emissions or deprive the engine of lubrication entrained in the fuel flow leading to overheating or even catastrophic failure. In any event, a user or operator of the power tool may lack the necessary range of fuel flow adjustment to keep the engine efficiently operating under the full range of temperature, humidity, altitude or other engine operating conditions which may be encountered.

With or without an enclosure or shroud, assembly and proper orientation of these caps is difficult and requires considerable dexterity. If improperly oriented, its tamper proof construction virtually prevents removal without damaging the cap and disturbing the optimum fuel flow setting of the valve.

SUMMARY OF THE INVENTION

A cap and method for limiting the range of adjustment of a fuel flow metering valve in a carburetor. The limiter cap has a body with a passage for telescopically axially receiving the head end of a shank of the metering valve therein. At the free end, the cap may have a face with a recess or opening therein for receiving an adjustment tool to rotate the cap, valve or both. An arm projects generally radially outwardly from the body to abut against a stop carried by or operably associated with the carburetor to limit valve rotation and hence adjustment.

In the passage, the cap has a retainer which retains the cap on the valve shank in a first position while allowing the cap to freely rotate relative to the valve. The cap is axially movable on the shank to a second position where a portion in the passage firmly engages the shank so that the cap and valve rotate only in unison to thereby limit adjustment of the valve by the arm engaging a stop. Preferably, the cap is movable to a third position in which a drive portion releasably engages the shank for rotating the shank to adjust the valve before the cap is moved to the second position to limit further adjustment of the valve. Preferably, the cap is locked in the second position to prevent removal of the cap from the shank to thereby insure continuous or tamper proof limiting of further adjustment of the valve. Preferably, a cam portion in the passage facilitates movement of the cap to the second position.

In typical use, the cap is pressed onto the valve shank to a first position where it is retained on the shank and can rotate freely relative to the valve. On the shank, it may be moved from this position to releasably engage the valve for adjusting fuel flow. After carburetor performance has been optimized, the limiter arm is angularly or circumferentially positioned on the valve to provide the desired limits of user fuel flow adjustment. Once the arm is properly oriented, the cap is further pressed axially inwardly to a second position securing the cap to the valve in tight engagement therewith so the cap and valve can rotate only in unison. Any subsequent rotational adjustment of the valve is limited in either direction by the limiter arm striking a stop carried by or operably associated with the carburetor.

An object of the limiter cap of this invention is to restrict adjustment of a valve to prevent excessive engine exhaust emissions and engine overheating or failure.

Another object is to facilitate quick and easy assembly of the cap to a needle valve of a carburetor body and final calibration of the carburetor while operating on an engine without requiring the removal of the grommet and engine shroud after final carburetor calibration.

Another advantage is this limiter cap may be installed after initial calibration of an assembled carburetor on a flow test bench and prior to performing final calibration of the carburetor on an engine.

A further object of the present invention is that it allows assembly of the limiter cap onto a needle valve of the carburetor to enable rotational adjustment of each valve during carburetor calibration, simple and accurate positioning of the arm of each cap relative to the final adjusted position of the valve and carburetor stops, and easy assembly of the cap into secure locking engagement with the valve to allow rotation of the cap and valve only in unison while limiting rotational adjustment of the valve in either direction.

Another object of this cap is to allow limited fuel flow adjustment to enable a user of an engine powered tool to adequately adjust carburetor performance to fine tune engine operation under a variety of operating conditions while preventing fuel flow overadjustment possibly causing excessive exhaust gas emissions or engine overheating.

A still further advantage of this invention is that it allows quick and easy limiter arm orientation when mounted in a freely rotating position on the valve to expediently, yet accurately, fix the allowable range of valve rotation.

Another advantage is that the cap may be carried on the valve during assembly without dislodging or vibrating free.

These and other objects, features and advantages of this invention will be apparent from the following detailed description and appended claims in which the invention is set forth together with sufficient details to enable persons skilled in the art to practice the invention all in connection with the best mode presently contemplated of the invention.

BRIEF DESCRIPTION OF THE DRAWINGS

DRAWINGS accompany the disclosure and the various views thereof may be briefly described as.

DETAILED DESCRIPTION OF THE INVENTION AND THE MANNER AND PROCESS OF USING IT

Figure 1:
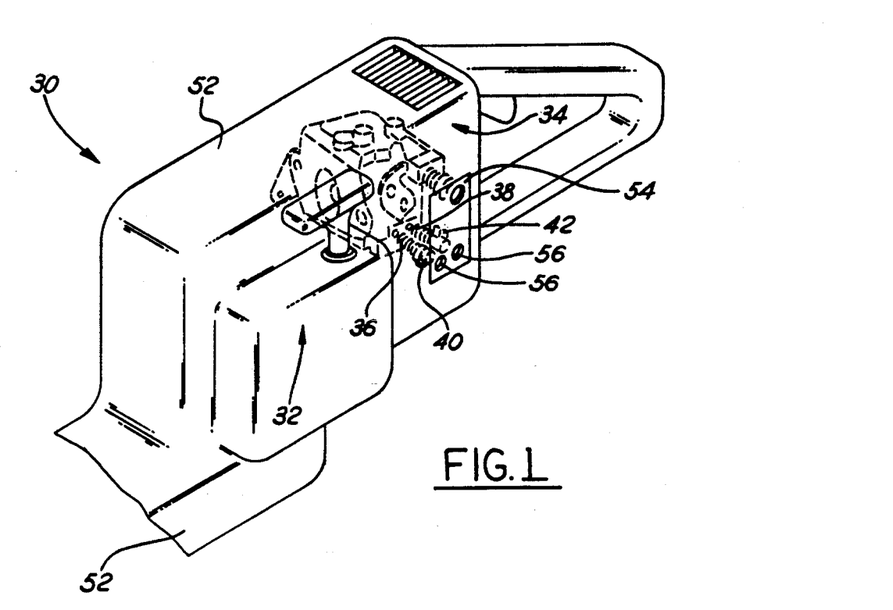
FIG. 1, is a fragmentary perspective view of a hedge trimmer having a two-stroke engine with a carburetor with fuel flow metering needle valves and limiters of this invention.
Figure 1A:
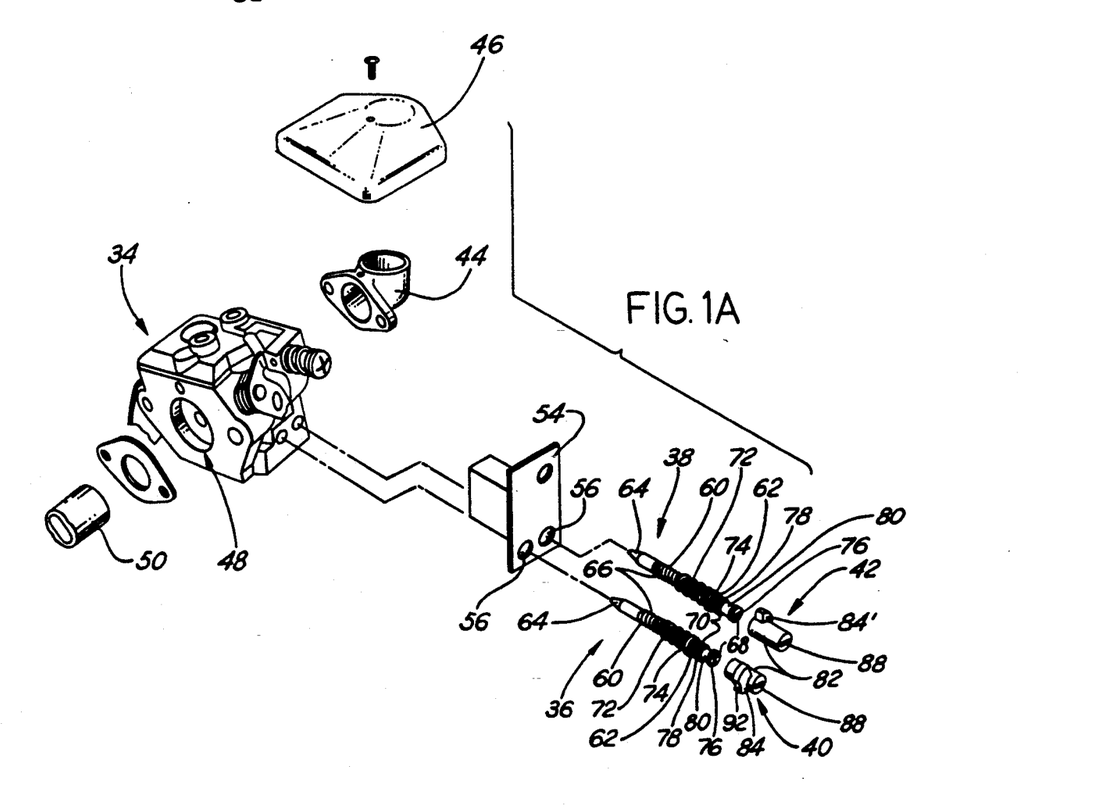
FIG. 1A, is an exploded perspective view of the carburetor, main and idle needle valves, and limiter caps for each valve.

With reference to the drawings, FIGS. 1 and 1A illustrate a typical assembly of a hand-held power tool 30 such as a hedge trimmer with a two-stroke gasoline engine 32 having a carburetor 34 with idle 36 and main 38 needle valves and limiter caps 40, 42 of this invention. The idle 36 and main 38 valves meter fuel flow during low speed and high speed engine operation respectively.

The carburetor 34 has an air inlet 44 attached to an air cleaner 46 and an outlet 48 in communication with an intake manifold 50 of the engine 32. The engine 32 and carburetor 34 are enclosed by a housing or shroud 52 with a grommet 54 having a pair of access openings 56 axially aligned with each cap 40, 42 to enable limited valve adjustment while preventing tampering with or removal of either cap.

Figures 2, 3:
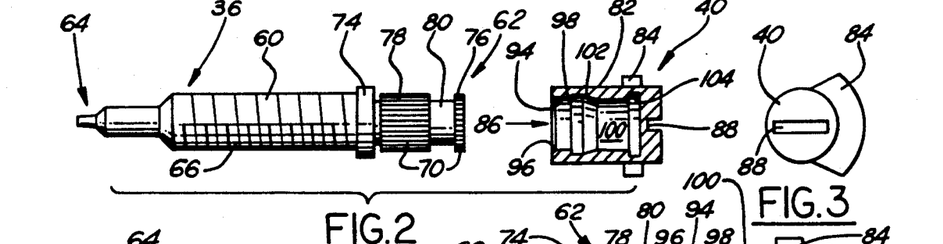
FIG. 2, is an exploded side view of a needle valve and a cap in section of this invention.
FIG. 3 is a front view of the cap.

As shown in FIGS. 1A and 2, each valve 36, 38 has an elongated generally cylindrical shank 60 with a head 62 at one end and a generally conical valve control surface 64 at the other end. The shank 60 has a plurality of threads 66 about its outer periphery to engage with complementary threads (not shown) within the carburetor body to enable secure insertion of the valve 36 therein and axial adjustment of the needle valve 36 within a fuel flow passage.

Typically, a recess or slot 68 is provided in the free end of the valve 36 for receiving an adjustment tool, such as the blade of a screwdriver, for facilitating rotational adjustment of the valve 36. Alternatively, a plurality of axial ridges or knurls 70 in the outer peripheral surface of the head 62 may be engaged by a tool or manually for adjustment. Unintentional valve rotation during engine vibration is prevented by a spring 72 received over the valve shank 60 and disposed between the carburetor body 34 and a flange 74 on the valve shank 60 adjacent the head 62.

Preferably, the head 62 of each needle valve 36, 38 is separated into a first segment or shoulder 76 at the end of the valve and a second segment 78 adjacent the spring retaining flange 74 by a circumferentially continuous groove 80. Preferably, for firm engagement with the cap, the head segments 76, 78 may also be knurled with axially extending flutes.

Each cap 40, 42 has a body 82 with an arm 84 projecting therefrom for limiting valve rotation and hence adjustment. The location of the arm 84, 84' on the body is the only difference between these caps. For axially telescoping the cap 40 over the end of a valve 36, the body 82 has a passage 86 therein. Portions within the passage 86 enable the cap 40 to be carried on a valve 36 in a freely rotating first position during assembly and limiter arm 84 orientation, in a second position securing the cap 40 to the valve 36 to limit adjustment and maintain emissions calibration, and in a third position to releasably drivingly engage the valve 36 to perform fuel flow adjustment. The body 82 also has a generally slotted recess 88 in the face of the free end of the cap 40 for receiving an adjustment tool therein.

The limiter arm 84 is an arcuate flanged projection which extends generally radially outwardly from the body 82 for abutting against a stop 90 carried by or operably associated with the carburetor to limit rotation to less than a complete revolution. The stop may be an adjacent valve shank, a cap mounted thereon (FIG. 7) 90, a fixed stop 90' projecting from the carburetor body (FIG. 8), a projection extending from the housing 52, grommet 54, or engine 32 (not shown), or the like. Preferably, the arm 84 is set axially back from the cap face to allow adjustment without the surrounding grommet 54 objectionably interfering with the arm 84. However, in applications where the carburetor 34 is not enclosed by a grommet 54 or shroud 52, the arm 84 may be located anywhere along the axial length of the body 82. Preferably, the angle subtended by the flange arm 84 is sufficient to limit the extent to which the valve 36 can be rotated to fine tune the engine, or to conform with any required emissions regulation. The arm 84 may have a locator indention 92 in its outer periphery to facilitate its use in an automatic cap feeding device.

Figure 4:
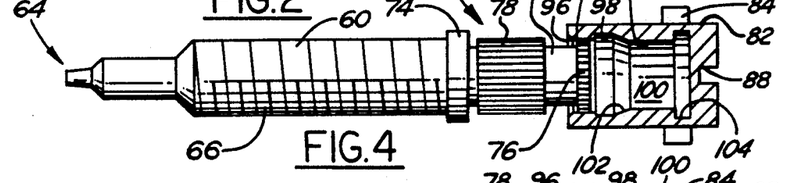
FIG. 4, is a sectional view of the cap assembled in a driving position on a head of the valve.

As shown in FIG. 4, the cap 40 may be mounted on the valve 36 in a driving position with a first portion or circumferentially continuous rib 94 within the passage 86 adjacent the opening releasably drivingly engaging the knurled head 62. When releasably drivingly mounted in this position, the cap 40 and hence the valve 36 can be rotated in unison to perform initial calibration adjustments. The mouth of the passage 86 has a chamfer 96 to facilitate entry of the valve head 62 into the rib 94.

Figure 5:
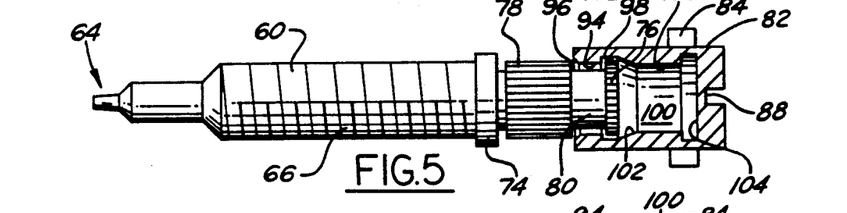
FIG. 5, illustrates the cap assembled in a retainer position on the valve.

Frequently, however, the cap 40 is first placed on the head 62 in the retainer position shown in FIG. 5 which allows the cap 40 to rotate freely with respect to the valve 36 while retained thereon. When mounted in this position, the first segment 76 of the valve head 62 is received in a circumferentially continuous recess 98 in the passage 86 with sufficient clearance to enable free rotation. Preferably, the rib 94 of the passage 86 and the shoulder 76 of the valve 36 have an interference fit to retard removal from this freely rotating position. If desired, to releasably drivingly couple the cap 40 to the shank 60 of the valve 36 for adjusting it, the cap 40 can be pushed slightly axially inwardly to engage the chamfer 96 with the second head segment 78 to adjust the valve 36 by rotating the cap 40. When in this releasable driving position, the chamfer 96 and portion of the first rib 94 adjacent chamfer 96 within the cap passage 86 may also releasably engage the knurled first 76 and second 78 head segments respectively. Upon releasing the cap 40, it will normally return to the retainer position where it can freely rotate relative to the valve 36.

Figures 6, 7, 8:
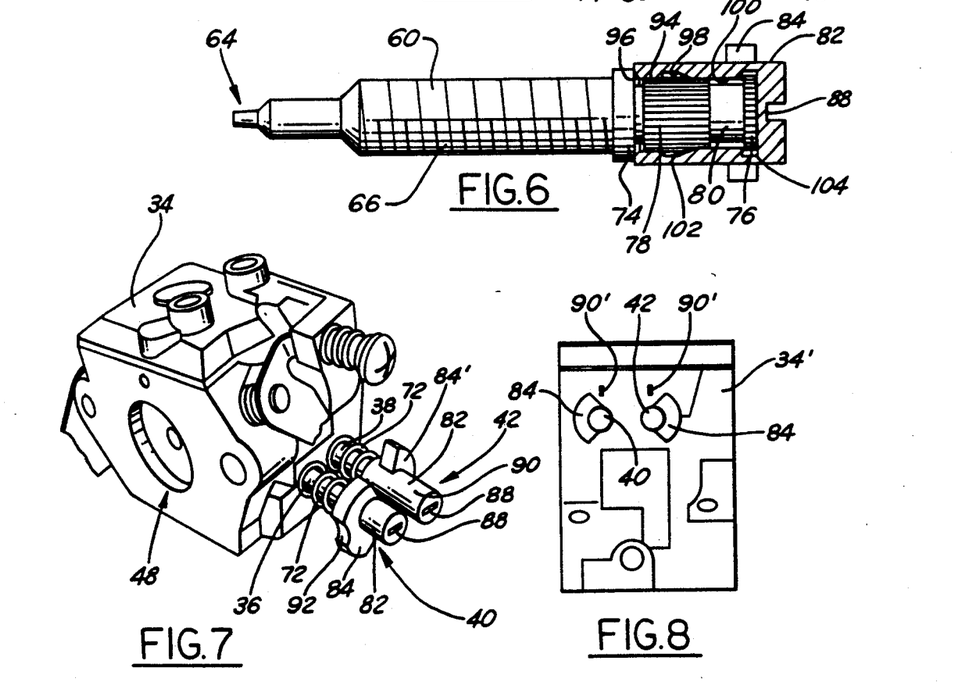
FIG. 6, illustrates the cap secured in a limiter position on the valve.
FIG. 7, is a perspective view of a carburetor assembly illustrating caps of this invention mounted on both the main and idle needle valves.
FIG. 8, is a front view of a second carburetor configuration.

As shown in FIG. 6, to securely couple the cap 40 to the valve 36, the cap 40 may be pressed further axially onto the valve 36 so the head 62 frictionally engages and/or intermeshes with a circumferentially continuous rib in a third portion 100 of the passage 86. To facilitate insertion of the head 62 into the third portion 100, it has an inclined camming surface 102. Preferably, the rib 100 has an interference fit and when received in this position the material of the inner peripheral surfaces of the first 94 and third 100 portions deform around the knurls of the second head segment 78 to securely couple together the valve 36 and cap 40 for simultaneous rotation and to resist removal of the cap 40. An interference fit between an adjacent shoulder of a circumferentially continuous recess 104 at the end of the passage 86 and the adjacent edge of the first segment 76 of the head 62 securely locks the cap 40 to the valve 36 further preventing removal.

FIGS. 9-12 illustrate a second form of a needle 36' and a cap 40'. The needle valve 36, is essentially the same as needle 36 except that the first head segment 76, has a slot 68 therein for receiving the blade of a tool, such as a screwdriver, to rotate the valve 36' and a peripheral cam surface 106. To facilitate insertion of a tool through the cap 40' to engage the slot 68 of the needle valve 36', the body 82 has an access hole 108 through the free end thereof. In all other respects, the cap 40' has essentially the same construction as cap 40.

Figures 9, 10, 11:
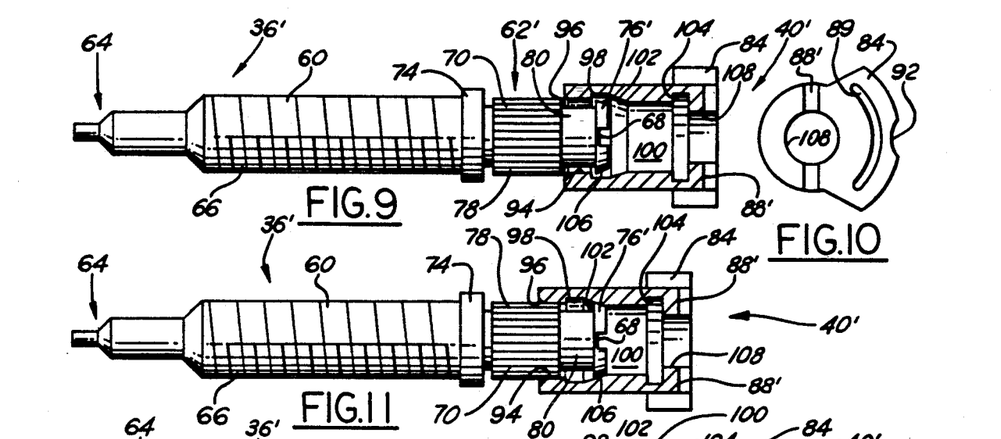
FIG. 9, is a side sectional view of a second cap embodiment assembled in a retainer position on the valve.
FIG. 10, is a front view of the second cap.
FIG. 11, illustrates the second cap in a releasable driving position on the valve.
Figure 12:
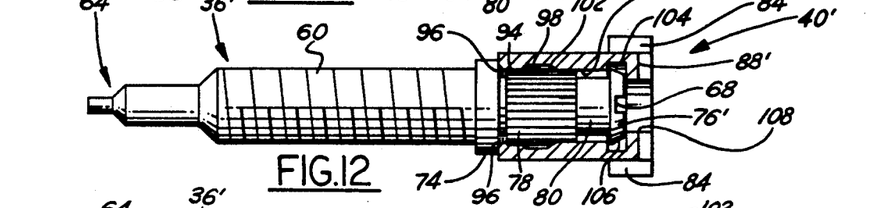
FIG. 12, illustrates the second cap securely assembled in a limiter position on the valve.

As shown in FIG. 9, the cap 40' can be disposed in a first position on the needle valve 36' where it is retained thereon while being freely rotatable relative to the valve 36' so that it does not drivingly engage it. As illustrated in FIG. 11, the cap 36' can be pushed slightly axially inward of this position, either manually or with a tool engaging slot 88' or an arcuate relief indentation 89 in flange 84, to releasably drivingly engage the chamfer surface 96 with the adjacent end of the second head segment 78 to drivingly turn the valve 36' by rotating the cap 40'. If necessary, a portion of the first rib 94 adjacent the chamfer 96 may also releasably engage the second head segment 78 to facilitate adjusting the valve 36'. When released, the cap 40' will normally return to the retained position (FIG. 9) where it can freely rotate relative to the valve 36'. Alternatively, the valve can be directly adjusted by inserting a tool through bore 108 and engaging slot 68. As shown in FIG. 12, the cap 40' can be pressed further axially onto the valve 36' to a second position where the valve 36' and cap 40' are securely coupled together to limit rotation of the valve 36'. If desired, fine adjustment may be made by using a tool to engage slot 88' or indention 89 in the cap or slot 68 in the first segment 76' of the valve head 62'.

Figure 13:
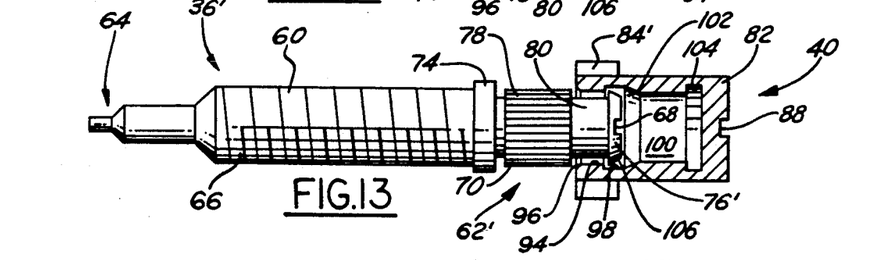
FIG. 13, is a side sectional view of a third cap embodiment assembled in a retainer position on a valve.
Figure 14:
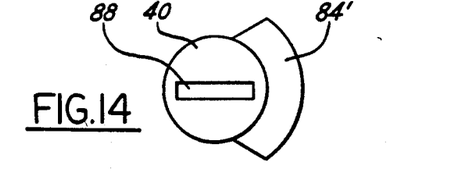
FIG. 14, is a front view of the third Cap.
Figure 15:
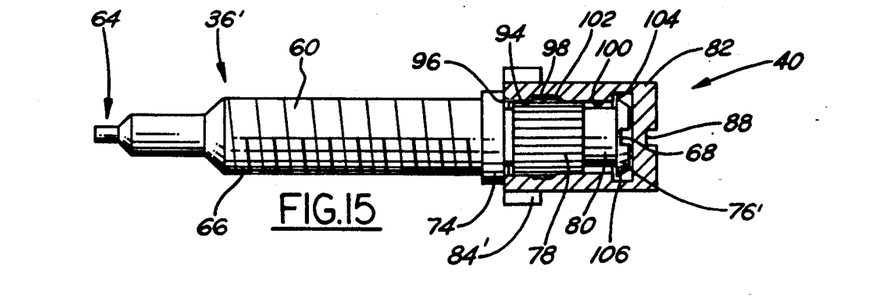
FIG. 15, illustrates the third cap securely assembled in a limiter position on the valve.

FIGS. 13-15 illustrate a third form of the invention with needle valve 36' and cap 40. Since the cap 40 has a closed free end with a driving slot 88 therein, once the cap 40 is received on the needle valve 36', the slot 88 in the head 62' of the valve 36' cannot be directly engaged to rotate the valve 36'.

As shown in FIG. 13, in a first position the cap 40 is retained on the valve 36' while being freely rotatable relative to the valve 36' and can be pushed slightly axially inward of this position to engage the chamfered portion 96 with the head 62' to drivingly turn the valve 36' by rotating the cap 40. As shown in FIG. 15, the cap 40 can be pushed further axially onto the valve 36' to a second position to couple and secure the cap 40 and valve 36' for rotation therewith to limit adjustment of the valve 36'.

Figure 16:
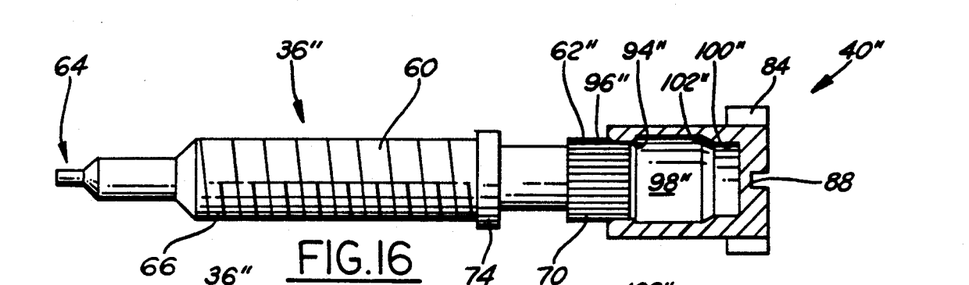
FIG. 16, is a side sectional view of a fourth cap embodiment assembled in a driving position on the valve.
Figure 17:
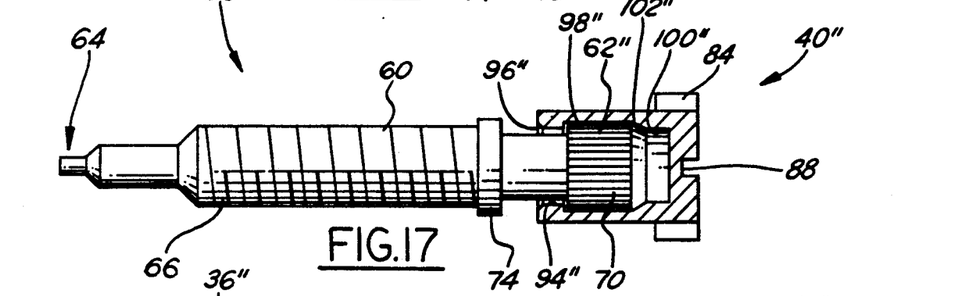
FIG. 17, illustrates the fourth cap assembled in a retainer position on the valve.
Figure 18:
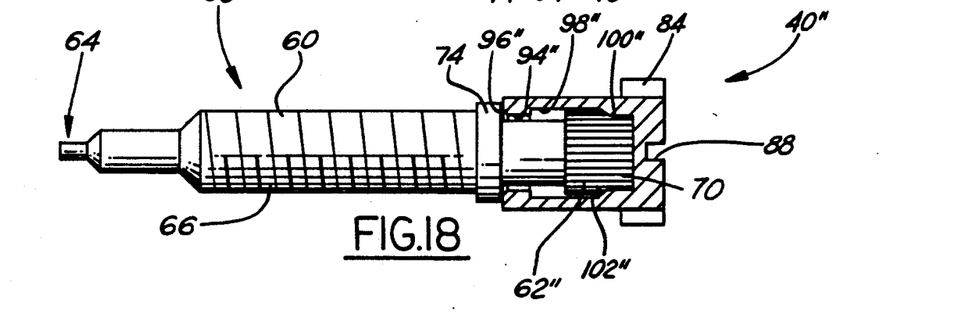
FIG. 18, shows the fourth cap securely assembled in a limiter position on the valve.

A fourth form of the invention is shown in FIGS. 16-18 with a needle valve 36" and a cap 40". As shown in FIG. 17, the cap 40" is releasably retained and freely rotates in a first position on the valve 36" by the cooperation of a circumferentially continuous recess 98" in the passage of the cap 40" and a head 62" on the free end of the valve 36". The cap 40" is retained on the head 62" in the freely rotating position by the cooperation of the adjacent edge or shoulder of the recess 98" which has a slight interference fit with the adjacent edge of the head 62". As shown in FIG. 18, in a second position, the cap 40" is securely coupled to the valve 36" by frictional or intermeshing engagement of the head 62" with a third portion 100" of the passage to limit adjustment of the valve 36". Insertion of the head 62" into the inner rib 100" is facilitated by a chamfer 102" at the entrance thereto. As shown in FIG. 16, if desired, initially the cap 40" can be releasably drivingly engaged with the head 62" of the needle valve 36" by pushing the shoulder of the first passage portion 94" into engagement with the leading portion of the head 62". The chamfer 96" facilitates engaging the shoulder with the head 62".

ASSEMBLY AND USE

In use, the caps may be pressed onto the valve 36 to a position where the first segment 76 of the valve head 62 engages with the rib 94 of the cap passage 86. While in this position, the valve 36 may be adjusted, such as during flow testing or final calibration. To adjust the valve 36, torque is applied to the cap 40 through an adjustment tool engaging the cap recess 88.

Usually, however, the cap 40 is initially mounted to and carried by the valve 36 in the freely rotating retainer position. Advantageously, the cap 40 may be attached in this retainer position any time after flow testing so that the carburetor 34 may be shipped or other assembly operations performed without inadvertently disturbing the valve calibration. For example, it may be desirable to assemble the grommet 54, shroud 52 or both after attaching the cap 40 in this retainer position. During this stage of assembly, fine adjustment of fuel flow to tune actual engine operation in compliance with emissions requirements may be simply and easily achieved.

To fine tune fuel flow while in the freely rotating retainer position, the slotted cap face 88 is engaged by an adjustment tool and a sufficient axially inward force is applied against the cap 40 causing the first passage section 94 to releasably engage the knurled second segment 78 enabling rotation in unison. While engaged, the cap 40 and valve 36 may be rotated until engine exhaust emissions fall within the desired range. If the limiter arm 84 abuts against a stop 90 and more adjustment is needed, the applied force can be withdrawn releasing the cap 40 from frictional engagement and the arm 84 freely rotated away from the stop 90 without rotating the valve 36 to provide an additional range of adjustment. To further adjust the valve 36, sufficient force may be once again applied to engage the head 62 and a torque applied to rotate the cap 40 and valve 36 in unison. In this manner, the cap 40 may be used to ratchet the valve 36 in either direction to provide an unlimited range of adjustment. However, if the cap 40' has a through-opening 108, as in FIGS. 9-12, emissions calibration may also be performed at this assembly stage simply by directly engaging the valve 36 with an adjustment tool.

Before securing the cap 40 to the valve 36, the cap 40 is freely rotated to easily and accurately orient the limiter arm 84 relative to the calibrated valve 36 and stop member 90. To stay within emissions restrictions while allowing sufficient user adjustment to keep the engine efficiently operating, the limiter arm position, arm flange width and stop configuration and position are selected, designed and constructed as will be apparent to skilled persons and need not be described in further detail.

Once the limiter arm 84 is circumferentially positioned on the valve 36, a force is applied to axially move the cap 40 into firm frictional engagement with the knurled head 62 preventing removal and tampering. Optionally, valve adjustment may be performed after final cap assembly if the allowable range of rotation is sufficient to properly calibrate fuel flow. In this final position, valve 36 rotation in either direction is restricted by the arm 84 abutting with a stop 90 preventing emissions-violating overadjustment by an end user while enabling a sufficient adjustment range to fine tune engine performance in response to a wide range of operating conditions.

Preferably, the limiter caps are of one piece, unitary construction for simpleness and ease of manufacture and are constructed from a generally homogeneous material such as Zytel or Minlon, nylon formulations which are both registered trademarks of E. I. Du Pont De Nemours and Company, a different nylon formulation, Delrin (a POM thermoplastic) also a Du Pont material, or another high temperature thermoplastic material. A cap constructed of any of these materials is strong and resilient and able to deform around the knurls of the valve head to more positively frictionally secure the cap to the valve while resisting brittle fracture if tampered with. More generally, however, the caps could also be composed of a phenolic, polyurethane, polyacrylic, rubber or some other plastic material.

While the present invention has been disclosed in connection with the preferred embodiments thereof, it should be understood that there may be other embodiments which fall within the spirit and scope of the invention and that the invention is susceptible to modification, variation and change without departing from the proper scope or fair meaning of the following claims.

What is claimed is:

1. A cap for limiting adjustment of fuel flow in a carburetor by a valve having a rotatable shank with a head end projecting from the carburetor; comprising, a body having a passage therein constructed and arranged to be telescopically received over the head end of the shank of the valve, retainer means in said passage and constructed and arranged to retain said body in a first telescoped position on the shank with the shank being freely rotatable relative to said body, engagement means in said passage and constructed and arranged to engage with the head end when said body is telescoped over the shank and in a second position axially spaced from said first position to couple the shank with said body so that the shank and said body can rotate only in unison when said body is in said second position, an arm fixed to said body and projecting generally radially thereof and constructed and arranged to limit the extent of rotation of the shank to less than one revolution when said body is in said second position by engagement of said arm with at least one stop operably associated therewith, whereby when said body is telescoped over the shank and in said first position the shank can rotate relative to said body and when in said second position said body and the shank can only be rotated in unison and said arm is engagable with at least one stop to limit the rotation of the shank and cap to less than one complete revolution to thereby limit adjustment of the valve.

2. The cap of claim 1 wherein said passage extends completely through said body and is constructed and arranged to permit an adjustment tool to be disposed therein and engaged with a recess in the head end of the shank and which has a non-circular cross-section for rotating the shank relative to the carburetor when the cap is telescopically received on the shank.

3. The cap of claim 1 wherein said passage extends completely through said body and is constructed and arranged to permit an adjustment tool to be disposed therein and engaged with a slot in the head end of the shank for rotating the shank relative to the carburetor when the cap is telescopically received on the shank.

4. The cap of claim 1 which also comprises, a recess in an end of said body, having a non-circular cross-section and constructed and arranged to receive a tool therein for rotating the cap relative to the carburetor.

5. The cap of claim 1 which also comprises, a slot in an end of said body, having a non-circular cross-section and constructed and arranged to receive a tool therein for rotating the cap relative to the carburetor.

6. The cap of claim 1 which also comprises, a recess in an end of said body, having a non-circular cross-section and constructed and arranged to receive a tool therein for rotating the cap relative to the carburetor, and wherein when said body is telescoped over the shank and in a third position axially displaced from said first and second positions, said body drivingly engages the shank so that rotating said body also rotates the shank in unison therewith to adjust fuel flow of the carburetor.

7. The cap of claim 1 which also comprises, a recess in an end of said body, having a non-circular cross-section and constructed and arranged to receive a tool therein for rotating the cap relative to the carburetor, and drive means in said passage constructed and arranged to engage with the shank for drivingly rotating the shank in unison with rotation of said body when said body is telescoped over the shank and in a third position thereon axially spaced from both said first and second positions, whereby when said body is in the third position rotation of said cap by a tool disposed in said recess of said body drivingly rotates the shank of the valve to adjust fuel flow of the carburetor.

8. The cap of claim 1 which also comprises, a ramp disposed in said passage adjacent said retainer means and constructed and arranged to facilitate engagement of the shank with said engagement means when said body is generally axially moved from said first position to said second position on the shank.

9. The cap of claim wherein said arm is disposed immediately adjacent the free end of said body of said cap.

10. The cap of claim 1 which also comprises a locator notch in the outer periphery of said arm for facilitating the location and orientation of the cap for assembly.

11. The cap of claim 1 which also comprises a locator indention in said arm for facilitating the location and orientation of the cap for assembly.

12. The cap of claim 1 wherein at least one stop carried by the carburetor comprises, a shank of another fuel flow adjusting valve of the carburetor which projects into the arcuate path of rotation of said arm of said body at least when said body is in its second position.

13. The cap of claim 1 wherein at least one stop carried by the carburetor comprises, a body of another limiter cap telescopingly received over a shank of another fuel flow adjusting valve of the carburetor which projects into the arcuate path of rotation of said arm of said body at least when said body is in its second position.

14. The cap of claim 1 wherein at least one stop carried by the carburetor comprises, a projection fixed to the body of the carburetor and disposed in the arcuate path of said arm at least when said body is in said second position on the shank.

15. The cap of claim 1 wherein said body and arm are of one homogeneous piece of a plastic material which is at least somewhat resilient.

16. The cap of claim 1 wherein said body and arm are of one homogeneous piece of a nylon or polyoxymethylene plastic material which is at least somewhat resilient.

17. The cap of claim 1 wherein said engagement means is constructed and arranged to have a press fit with the shank when said body is in said second position on the shank.

18. The cap of claim 1 which also comprises a recess in an end of said body, having a non-circular cross-section and constructed and arranged to receive a tool therein for rotating the cap relative to the carburetor, and wherein when said body is telescoped over the shank and in a third position axially spaced from said first and second positions, drive means in said passage for engaging the shank for rotating said body and the shank in unison therewith when in said third position to adjust fuel flow of the carburetor, latching means in said passage and constructed and arranged to latch with the shank when said body is telescoped over the shank and in said second position to retard removal of the cap from the valve.

19. The cap of claim 1 which also comprises a recess in an end of said body, having a non-circular cross-section and constructed and arranged to receive a tool therein for rotating the cap relative to said carburetor when said body is telescoped over the shank and in a third position axially displaced from said first and second positions.

20. For a carburetor having a valve for adjusting fuel flow by rotating a shank of the valve projecting from the carburetor, an adjustment limiting apparatus comprising, a body having a passage therein constructed and arranged to be telescopically received over an end of the shank, a recess in one of said end of the shank and said passage in said body, a projection on the other one of said shank and in said passage of said body, at least one of said recess and said projection being substantially circumferentially continuous and said recess and projection being constructed and arranged so that when said body is telescoped over the shank in a first position, said projection is received in said recess so that the shank can be rotated relative to said body and said body is retained on the shank, a head on the shank, an engagement portion in the passage of said body which engages with said head when said body is received on the shank in a second position axially spaced from said first position to couple said body to the shank for rotation only in unison therewith, an arm fixed to said body and projecting generally radially thereof and constructed and arranged to limit the extent of rotation of the shank to less than one complete revolution at least when said body is in said second position by engagement of said arm with at least one stop carried by the carburetor and projecting into the arcuate path of rotary movement of said arm, whereby when said body is telescoped over the shank and in said first position, the shank can rotate relative to the body while retained thereon and when in said second position the shank and said body can be rotated only in unison and said arm is engagable with at least one stop to limit the rotation of the shank and said body to less than one complete revolution to thereby limit adjustment of the valve.

21. The apparatus of claim 20 wherein said head has a knurled surface thereon engagable with said engagement portion in said passage of said body when in said second position, and said body and said arm are of a one-piece homogenous plastic material which is at least slightly resilient.

22. The apparatus of claim 20 wherein said passage extends completely through said body and is constructed and arranged to permit an adjustment tool to be disposed therein and engaged with a recess in the head end of the shank and which has a non-circular cross-section for rotating the shank relative to the carburetor when said body is telescopically received on the shank.

23. The apparatus of claim 20 which also comprises, a recess in an end of said body having a non-circular cross-section and constructed and arranged to receive a tool therein for rotating said body relative to the carburetor, drive means in said passage constructed and arranged to engage with the shank for drivingly rotating the shank in unison with rotation of said body when said body is telescoped over the shank and in a third position thereon axially spaced from both said first and said second positions, whereby when said body is in said third position rotation of said body by a tool disposed in said recess of said body drivingly rotates the shank to adjust fuel flow of the carburetor.

24. The apparatus of claim 20 which also comprises, a ramp disposed in said passage adjacent said engagement portion and constructed and arranged to facilitate engagement of the shank with said engagement portion when said body is generally axially moved from said first position to said second position on the shank.

25. The apparatus of claim 20 wherein the stop carried by the carburetor comprises, a shank of another fuel flow adjusting valve of the carburetor which projects into the arcuate path of rotation of said arm of said body at least when said body is in second position on the shank.

26. The apparatus of claim 20 wherein the stop carried by the carburetor comprises a body of another cap telescopingly received over a shank of another fuel flow adjusting valve of the carburetor which projects into the arcuate path of rotation of said arm of said body at least when said body is in its second position.

27. The apparatus of claim 20 which also comprises a cam surface on the shank inclined to the axis of rotation thereof and a follower surface in said passage in said body and constructed and arranged to facilitate engagement of said head with said engagement portion in said body when said body is moved from said first position to said second position on the shank.

28. The apparatus of claim 20 wherein said head and said engagement portions are constructed, arranged, and dimensioned to have a press fit.

29. The apparatus of claim 20 which also comprises a detent on the shank and latching means in said passage in said body and constructed and arranged to facilitate locking engagement with said detent when said body is moved to said second position on the shank to retard removal of the cap from the valve.

30. The apparatus of claim 20 which also comprises, a recess in an end of said body having a non-circular cross-section and constructed and arranged to receive a tool therein for rotating said body relative to the carburetor, engagement means in the passage of the body and constructed and arranged to releasably engage the shank when the body is telescoped over the shank and in a third position axially spaced from said first and second positions to releasably couple the shank with said body so that the shank and said body can rotate in unison when said body is in said third position, whereby when said body is in said third position rotation of said body by a tool disposed in said recess of said body rotates said body and the shank in unison to adjust fuel flow of the carburetor and when released from engagement said body moves on the shank to said first position.

31. A method of adjusting the fuel flow of a carburetor and limiting further adjustment thereof comprising, (a) providing a carburetor having at least one valve for adjusting fuel flow by rotating a shank of the valve projecting from the carburetor, (b) placing the carburetor in a test stand and rotating the shank to adjust fuel flow to a desired pre-determined value, (c) providing a limiter cap having a body with a passage therein constructed an arranged to be telescopically received over an end of the shank, the body having retainer means in the passage constructed and arranged to retain the body in a first position on the shank with the body being freely rotatable relative to the shank, and engagement means in the passage and constructed and arranged to engage with the shank when the body is telescoped over the shank and in a second position axially spaced from the first position to couple the shank with the body so that the shank and body can rotate only in unison when the body is in the second position, and an arm fixed to the body and projecting generally radially therefrom and constructed and arranged to limit the extent of rotation of the shank to less than one revolution when the body is telescoped over the shank and in the second position by engagement of the arm with at least one stop carried by the carburetor, (d) after step (b) positioning the cap on the shank with the body telescoped over the shank and in the first position thereof on the shank, (e) thereafter mounting the carburetor on an engine with which it will be utilized, (f) thereafter while operating the engine making any further needed adjustment of the valve by rotating the shank to fine tune fuel flow to optimize pre-determined operating parameters of the engine, and (g) after step (f) moving the body to the second position on the shank to thereby limit any subsequent adjustment of the valve by the arm of the cap bearing on at least one stop carried by the carburetor and disposed in the arcuate path of movement of the arm at least while the cap is in the second position on the shank.

32. The method of claim 31 which also comprises after the cap is disposed in the first position on the shank and before the fine tuning of the carburetor, the steps of disposing a shroud around the carburetor which has an access hole therein spaced from and generally axially aligned with the shank when the shroud is disposed in a pre-determined position and thereafter without removing the shroud steps (f) and (g) are performed of any fine tuning by inserting a tool through the opening in the shroud to rotate the shank, and of moving the cap to the second position on the shank.

33. The method of claim 31 which also comprises engagement means in the passage of the body and constructed and arranged to releasably engage the shank when the body is telescoped over the shank and in a third position axially spaced from the first and second positions to releasably couple the shank with the body so that the shank and body can rotate in unison when the body is in the third position, moving the body over the shank to the third position, rotating both the cap and valve in unison to adjust fuel flow until the arm of the body abuts against at least one stop carried by the carburetor, moving the cap to the first position on the shank, freely rotating the cap relative to the valve to rotate the arm away from at least one stop carried by the carburetor, moving the cap to the third position on the shank, rotating the cap and valve in unison to adjust fuel flow, and thereafter moving the cap to the second position on the shank.

34. The method of claim 31 which also comprises providing a recess in an end of the body, having a non-circular cross-section and constructed and arranged to receive a tool therein for rotating the cap relative to the carburetor, engagement means in the passage of the body and constructed and arranged to releasably engage the shank when the body is telescoped over the shank and in a third position axially spaced from the first and second positions to releasably couple the shank with the body so that the shank and body can rotate in unison when the body is in the third position, engaging the cap with a tool, moving the body over the shank to the third position, rotating both the cap and valve in unison to adjust fuel flow until the arm of the body abuts against at least one stop carried by the carburetor, moving the cap to the first position on the shank, freely rotating the cap relative to the valve to rotate the arm away from at least one stop carried by the carburetor, moving the cap to the third position, rotating the cap and valve in unison to adjust fuel flow, and thereafter moving the cap to the second position on the shank.

35. The method of claim 31 which also comprises providing a recess in an end of the body, having a non-circular cross-section and constructed and arranged to receive a tool therein for rotating the cap relative to the carburetor, engagement means in the passage of the body and constructed and arranged to releasably engage the shank when the body is telescoped over the shank and in a third position axially spaced from the first and second positions to releasably couple the shank with the body so that the shank and body can rotate only in unison when the body is in the third position, engaging the cap with a tool, moving the body over the shank to the third position, rotating both the cap and valve in unison to adjust fuel flow, moving the cap to the first position on the shank, freely rotating the cap relative to the valve to circumferentially orient the arm with respect to the valve and at least one stop carried by the carburetor, and thereafter moving the cap to the second position on the shank.

* * * * *

UNITED STATES PATENT AND TRADEMARK OFFICE
CERTIFICATE OF CORRECTION

PATENT NO. : 5,236,634

DATED : August 17, 1993

INVENTOR(S) : Steven L. Hammett and David L. Speirs

It is certified that error appears in the above-identified patent and that said Letters Patent is hereby corrected as shown below:

Column 10, Line 5, after "claim" insert "1".

Signed and Sealed this

Fifth Day of April, 1994

Attest:

BRUCE LEHMAN

Attesting Officer

Commissioner of Patents and Trademarks